United States Patent [19]

Huang

[11] Patent Number: 5,562,360
[45] Date of Patent: Oct. 8, 1996

[54] SPINDLE CONNECTOR FOR POWDER/LIQUID FEEDING SYSTEMS

[76] Inventor: Hsi-Hung Huang, No. 37, Lane 281, Hwa Cheng Road., Hsin Chuang City, Taipei Hsien, Taiwan

[21] Appl. No.: 425,976

[22] Filed: Apr. 20, 1995

[51] Int. Cl.[6] ............... B25G 3/00; F16B 7/10; F16D 1/00; F16C 3/00
[52] U.S. Cl. .......... 403/379; 403/305; 403/315; 403/378; 464/87; 464/182; 464/903
[58] Field of Search ................ 403/300, 2, 202, 403/305, 306, 309, 112, 311, 317, 378, 379; 464/87, 182, 903; 74/462, 493

[56] References Cited

U.S. PATENT DOCUMENTS

| | | | |
|---|---|---|---|
| 4,583,430 | 4/1986 | Farley | 403/378 X |
| 4,627,761 | 12/1986 | Olson et al. | 403/378 X |
| 4,891,034 | 1/1990 | Wilhelmsen | 403/300 X |
| 5,187,997 | 2/1993 | Henry-Moore | 403/372 X |

*Primary Examiner*—Blair Johnson
*Assistant Examiner*—Bruce A. Lev
*Attorney, Agent, or Firm*—Bucknam and Archer

[57] ABSTRACT

A spindle connector including a holder base having two rectangular mounting holes arranged at two opposite ends at right angles, two annular grooves spaced around the periphery, and two radial pin holes respectively made through the annular grooves for mounting a respective pin to hold a respective transmission shaft to the holder base; a transmission shaft having two opposite flat coupling portions at two opposite ends for fitting into one rectangular mounting hole on the holder base and two pin holes respectively arranged at the coupling portions at right angles for connection to one pin hole on the molder base; two binding rings respectively mounted around the annular grooves to hold a respective pin in each pin hole on the holder base; and a socket sleeved onto one end of the holder base and covered over the linked coupling portion of the transmission shaft for protection.

2 Claims, 4 Drawing Sheets

SPINDLE CONNECTOR FOR POWDER/LIQUID FEEDING SYSTEMS

BACKGROUND OF THE INVENTION

The present invention relates to spindle connectors, and relates more particularly to such a spindle connector for use with a powder/liquid feeding system.

Various powder/liquid feeding systems are well known and intensively used in factories and plants for delivering powdered/liquid products such as wine, powdered milk, sauce, powdered plastics, etc. These feeding systems commonly use a pump to propel the material to be delivered. Using a pump to propel a liquid material is effective. However, if the material to be delivered is made in the form of a powder, or in the form of a liquid containing solid particles, a "bridging" phenomenon will occur when the material 15 pumped into the piping of the feeding system, causing the piping to be blocked or partially blocked. In order to eliminate this problem, a rotor is commonly used and installed in the piping, and rotated to break the "bridging". The operation of the rotor can also mix the material during the delivery. FIG. 1 shows a regular power/liquid feeding system, in which an elongated, curved rotor 300 is connected to a motor through a shaft 200, which has both ends respectively connected to the output shaft of the motor and the rotor 300 by a respective spindle connector 100. When the material is sucked into the input port 400 and delivered to the output port 500, the rotor 300 is continuously turned by the motor to stir the material. The spindle connector 100, as shown in FIG. 2, comprises a holder base 101 having a longitudinal center hole 102. When the transmission shaft 104 is inserted through the longitudinal center hole 102, a bolt 103 is fastened to the holder base 101 and the transmission shaft 104 to hold them together. When the motor is started to turn the base 101, the transmission shaft 104 is moved in the direction, and therefore the rotor 300 is turned simultaneously. Because the bolt 103 bears the pressure transmitted from the motor and is moved against the transmission shaft 104, it tends to be deformed or broken, causing the feeding system to shut down.

SUMMARY OF THE INVENTION

The present invention has been accomplished to provide a spindle connector which eliminates the aforesaid drawbacks. According to the preferred embodiment of the present invention, the spindle connector comprises a holder base having two rectangular mounting holes arranged at two opposite ends at right angles, two annular grooves spaced around the periphery, and two radial pin holes respectively made through the annular grooves for mounting a respective pin to hold a respective transmission shaft to the holder base; a transmission shaft having two opposite flat coupling portions at two opposite ends for fitting into one rectangular mounting hole on the holder base and two pin holes respectively arranged at the coupling portions at right angles for connection to one pin hole on the holder base; two binding rings respectively mounted around the annular grooves to hold a respective pin in each pin hole on the holder base; and a socket sleeved onto one end of the holder base and covered over the linked coupling portion of the transmission shaft for protection.

DETAILED DESCRIPTION OF THE PREFERRED EMBODIMENT

Figure 1:
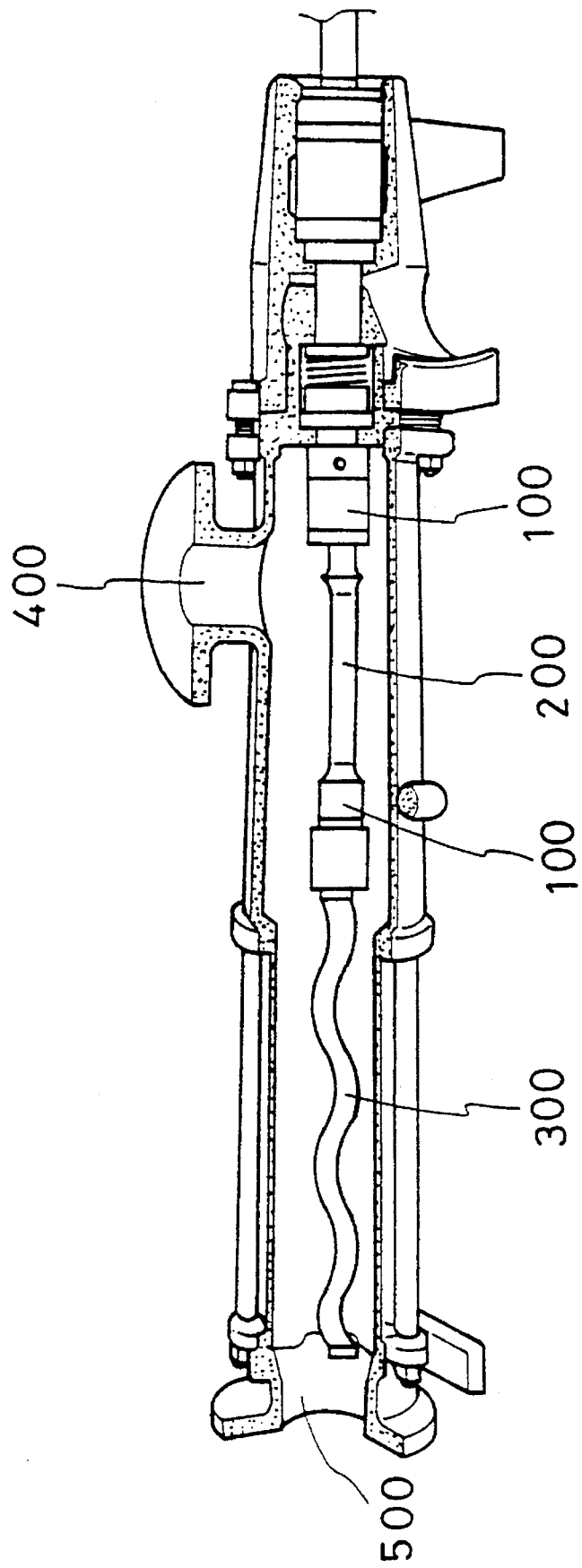
FIG. 1 is a longitudinal view in section of a powder/liquid feeding system according to the prior art, showing the installation of a rotor and spindle connectors in the piping.
Figure 2:
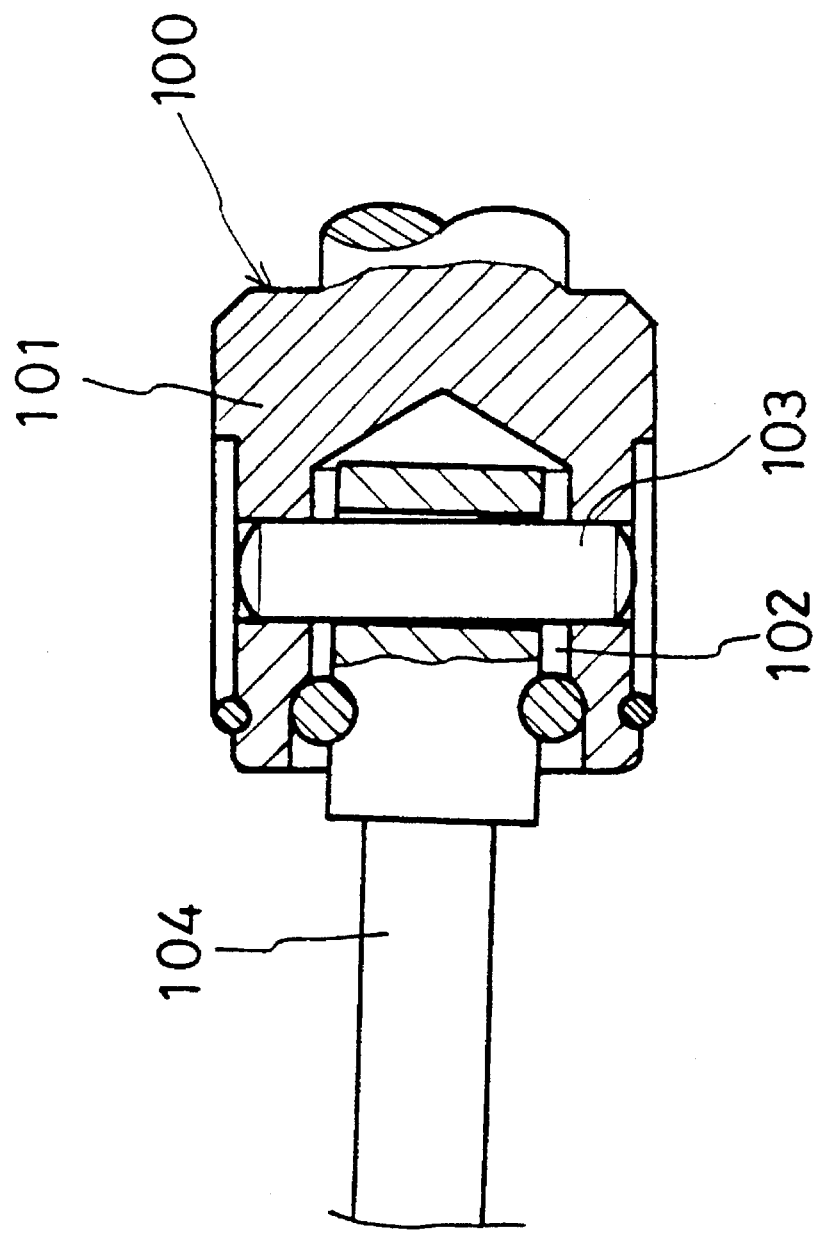
FIG. 2 a sectional view of a spindle connector according to the prior art.
Figure 3:
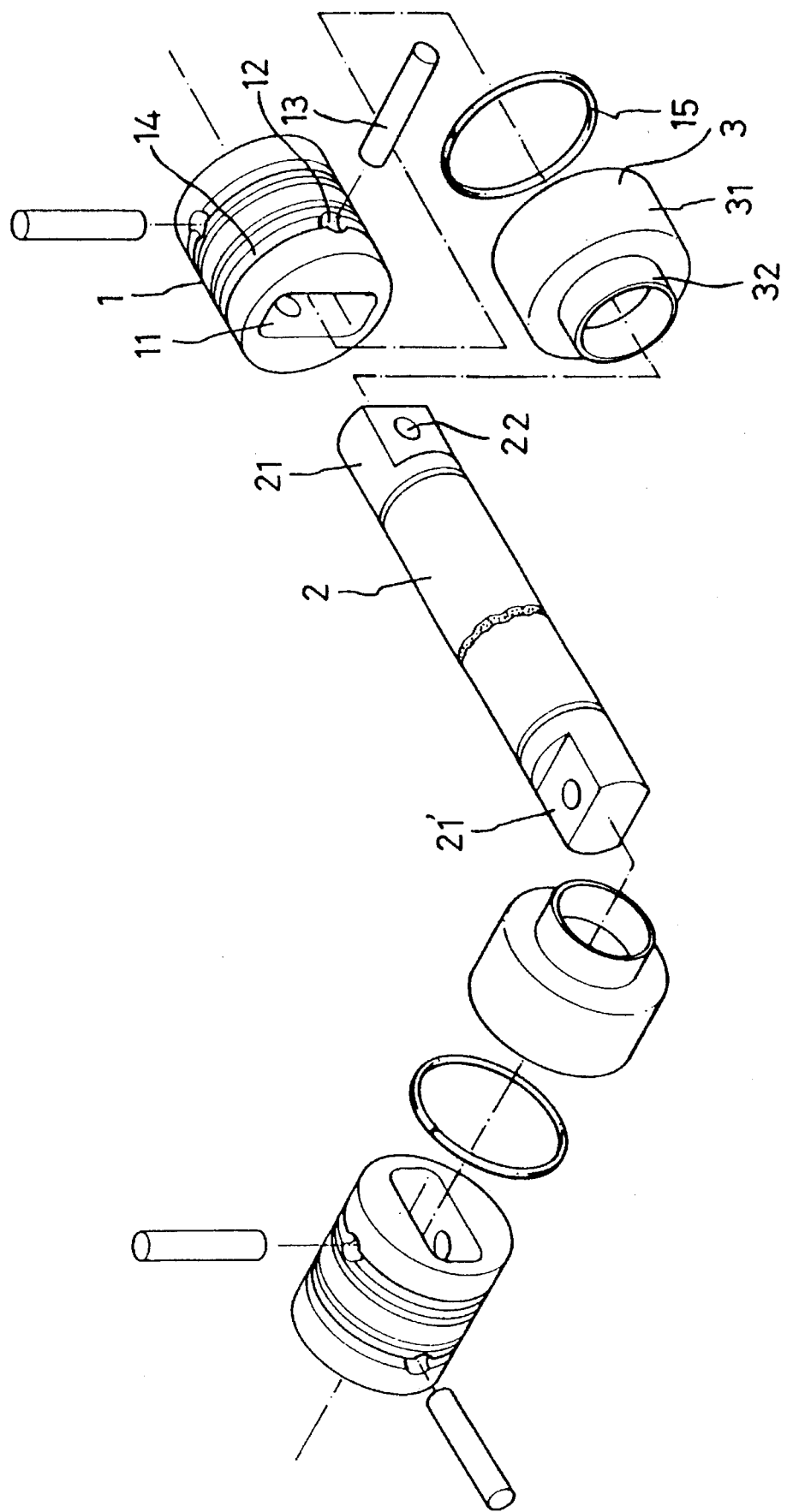
FIG. 3 is an exploded view of a spindle connector according to the present invention.
Figure 4:
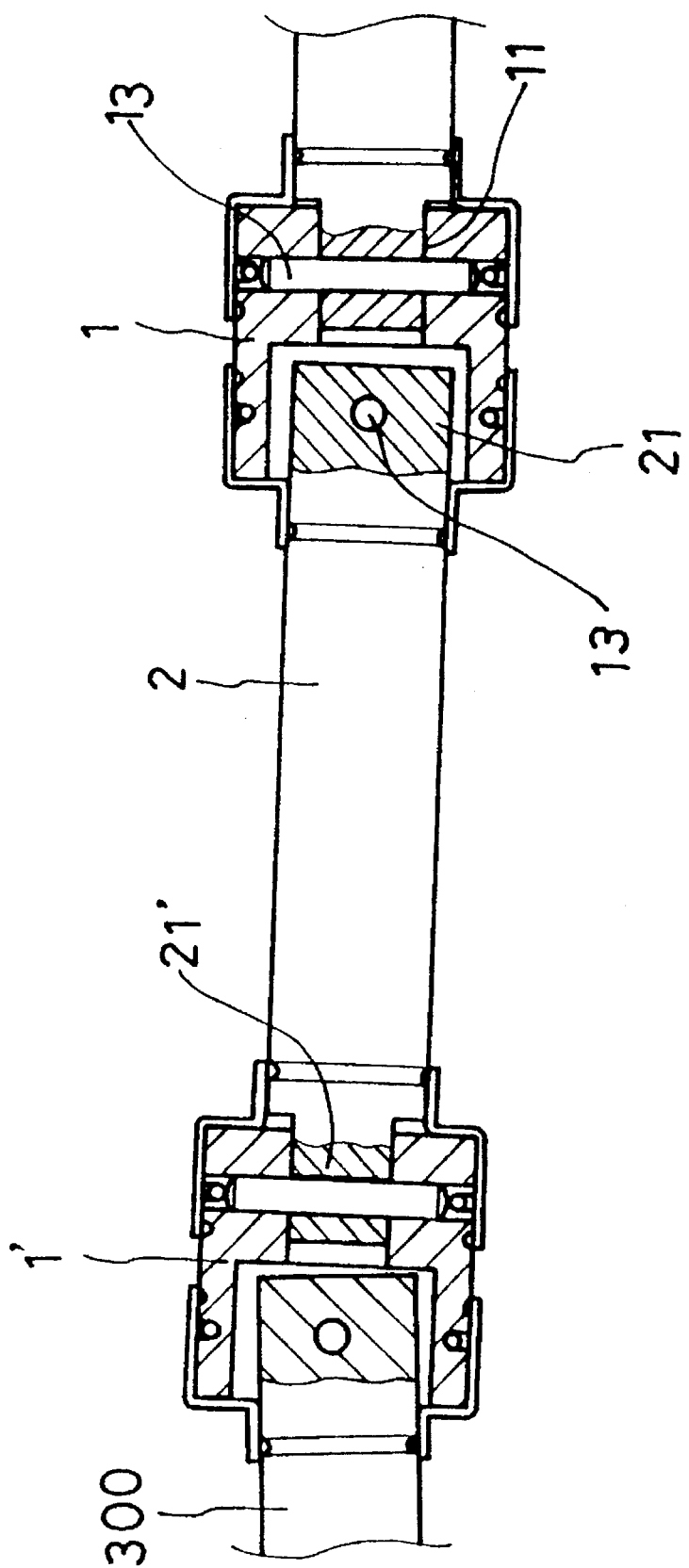
FIG. 4 is a sectional assembly view of the spindle connector shown in FIG. 3.

Referring to FIGS. 3 and 4, a spindle connector in accordance with the present invention is generally comprised of a holder base 1, a transmission shaft 2, and a socket 3. The holder base 1 is made of cylindrical shape having two rectangular mounting holes 11 arranged at two opposite ends thereof at right angles, two annular grooves 14 spaced around the periphery, and two radial pin holes 12 respectively made through the annular grooves 14 and the rectangular mounting holes 11 and disposed at right angles relative to each other. The transmission shaft 2 has two opposite ends terminating in a respective flat coupling portion, namely, the first coupling portion 21 and the second coupling portion 21' for fitting into a rectangular mounting hole 11, each coupling portion 21 and 21' defining a pin hole 22. The pin holes 22 of the coupling portions 21 and 21' of the transmission shaft 2 are arranged at right angles, i.e., one pin hole is arranged in the horizontal direction and the other in the vertical direction. The socket 3 comprises a socket body 31 for receiving the holder base 1, and a tubular neck portion 32 longitudinally extended from the socket body 31 at one end for receiving one coupling portion 21 or 21' of the transmission shaft 2.

Referring to FIG. 4, when the first coupling portion 21 of the transmission shaft 2 is inserted into one rectangular mounting hole 11 on the holder base 1, a pin 13 is inserted into the corresponding pin hole 12 on the holder base 1 and the corresponding pin hole 22 on the first coupling portion 21 to hold the transmission shaft 2 and the holder base 1 together, then a binding ring 15 molded of high molecular polymer elastic material is mounted around the corresponding annular groove 14 to hold the pin 13 in position, and then the socket 3 also molded of high molecular polymer elastic material is sleeved onto the transmission shaft 2 and the holder base 1 to covere over the first coupling portion 21 and the binding ring 15. When the second coupling portion 21' of the transmission shaft 2 is connected to a rotor 300 by another holder base 1, transmission power from the motor (not shown) can then be transmitted through the transmission shaft 2 to the rotor 300. When the motor is started, the first coupling portion 21 is turned up and down alternatively, the second coupling portion 21' is turned left and right alternatively, and the rotor 300 is turned up and down alternatively. During power transmission, the pressure bearing area is at the contact area between the rectangular mounting hole 11 and the coupling portion 21. This broad contact area permits the transmittal force to be applied over a large area. Furthermore, because the connecting area between the transmission shaft 2 and the holder base 1 is covered by the socket 3 which, because of its elasticity, remains in position so that powdered material is prohibited from entering the contact area between the transmission shaft 2 and the holder base 1 to obstruct the transmission of power.

It is to be understood that the drawings are designed for purposes of illustration only, and are not intended as a definition of the limits and scope of the invention disclosed.

What is claimed is:

1. A spindle connector comprising:

a holder base made of cylindrical shape having two rectangular mounting holes arranged at right angles at two opposite ends thereof, two annular grooves spaced around the periphery, and two radial pin holes respectively made through said annular grooves and said rectangular mounting holes and disposed at right angles relative to each other for mounting a respective pin to hold a respective transmission shaft to said holder base;

a transmission shaft having two opposite flat coupling portions at two opposite ends for fitting into one rectangular mounting hole, said coupling portions defining a respective pin hole for connection to one pin hole on said holder base by a pin, the pin holes of said coupling portions being arranged at right angles;

two binding rings respectively mounted around said annular grooves to hold a respective pin in the pin holes on said holder base; and a socket having a socket body covered on one end of said holder base over one binding ring and a tubular neck portion longitudinally extended from said socket body and covered over one coupling portion of said transmission shaft.

2. The spindle connector of claim 1 wherein said binding rings and said socket are respectively molded from elastic material of high molecular polymer.

* * * * *